(12) United States Patent
Klingbeil et al.

(10) Patent No.: US 10,891,582 B2
(45) Date of Patent: Jan. 12, 2021

(54) SMART INVENTORY FOR LOGISTICS

(71) Applicant: SAP SE, Walldorf (DE)

(72) Inventors: Thomas Klingbeil, Potsdam (DE);
Sebastian Kliem, Potsdam (DE); Uwe Keller, Ratingen (DE); Andreas Koch, Wiesloch (DE); Christophorus Laube, Potsdam (DE)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 16/168,196

(22) Filed: Oct. 23, 2018

(65) Prior Publication Data

US 2020/0126029 A1 Apr. 23, 2020

(51) Int. Cl.
*G06Q 10/08* (2012.01)
*G06K 7/10* (2006.01)
*G01S 19/13* (2010.01)

(52) U.S. Cl.
CPC ..... *G06Q 10/0833* (2013.01); *G06K 7/10297* (2013.01); *G01S 19/13* (2013.01)

(58) Field of Classification Search
CPC . G06Q 10/0833; G06K 7/10297; G01S 19/13
See application file for complete search history.

(56) References Cited

U.S. PATENT DOCUMENTS

| | | | | |
|---|---|---|---|---|
| 5,686,902 A | * | 11/1997 | Reis | G01S 13/74 340/10.2 |
| 5,913,180 A | * | 6/1999 | Ryan | B67D 7/145 702/45 |
| 5,999,091 A | * | 12/1999 | Wortham | G07C 5/008 340/10.2 |
| 6,148,291 A | * | 11/2000 | Radican | G06Q 10/08 705/22 |
| 6,236,911 B1 | * | 5/2001 | Kruger | G01G 19/08 701/1 |

(Continued)

FOREIGN PATENT DOCUMENTS

WO WO-2019068559 A1 * 4/2019 ............ B60R 25/25

OTHER PUBLICATIONS

Oseph Siror, "Impact of RFID Tehcnology on Tracking of Export Goods in Kenya", published by Journal of Convergence Information Technology on Nov. 2010, all pages (Year: 2010).*

*Primary Examiner* — Omar Zeroual
(74) *Attorney, Agent, or Firm* — Sterne, Kessler, Goldstein & Fox P.L.L.C.

(57) ABSTRACT

Disclosed herein are system, method, and computer program product embodiments for using a smart shipping to track one or more products contained therein. An embodiment operates by a transporting unit comprising a microcontroller, a transceiver, and a reliever, each of which is in communication with each other. The microcontroller is also in communication with a server external to the transporting unit. The transceiver is configured to o detect a transmitter attached to a product when the product is inside of the transporting unit. The receiver is configured to receive identifying information and a geographical location pertaining to the product. The microcontroller is then configured to send a message containing the identifying information and the geographical location pertaining to the product to the server.

20 Claims, 4 Drawing Sheets

(56) References Cited

U.S. PATENT DOCUMENTS

| | | | | |
|---|---|---|---|---|
| 6,437,702 | B1* | 8/2002 | Ragland | G01S 7/003 340/425.5 |
| 6,526,341 | B1* | 2/2003 | Bird | G07C 5/008 340/573.1 |
| 6,927,688 | B2* | 8/2005 | Tice | G06K 7/10306 340/539.1 |
| 6,975,224 | B2* | 12/2005 | Galley, III | B65D 90/00 340/539.18 |
| 6,982,656 | B1* | 1/2006 | Coppinger | G06Q 10/08 340/426.19 |
| 6,987,441 | B2* | 1/2006 | Roeland | G07C 9/00896 340/5.73 |
| 7,212,122 | B2* | 5/2007 | Gloekler | G01S 19/42 340/10.1 |
| 7,277,009 | B2* | 10/2007 | Hall | G08B 21/0269 340/539.22 |
| 7,319,397 | B2* | 1/2008 | Chung | B60R 25/00 340/572.4 |
| RE40,073 | E* | 2/2008 | Breed | G06Q 20/203 340/426.19 |
| 7,394,372 | B2* | 7/2008 | Gloekler | G01S 13/751 340/572.1 |
| 7,455,225 | B1* | 11/2008 | Hadfield | G07C 5/085 235/384 |
| 7,484,662 | B2* | 2/2009 | Schmidtberg | G06Q 10/025 235/385 |
| 7,492,258 | B1* | 2/2009 | Shoarinejad | H04L 63/0876 340/572.1 |
| 7,602,296 | B2* | 10/2009 | Ulibarri | G06Q 10/08 340/572.1 |
| 7,663,502 | B2* | 2/2010 | Breed | G01S 17/04 340/12.25 |
| 7,719,423 | B2* | 5/2010 | Himberger | G06K 17/0029 340/572.1 |
| 7,760,092 | B1* | 7/2010 | Hanania | G06Q 30/02 340/572.1 |
| 7,932,827 | B2* | 4/2011 | Chand | G01C 21/206 340/572.1 |
| 7,936,266 | B2* | 5/2011 | Francis | G09F 3/0352 340/545.1 |
| 8,009,034 | B2* | 8/2011 | Dobson | H04Q 9/00 340/539.1 |
| 8,989,053 | B1* | 3/2015 | Skaaksrud | G01C 21/00 370/255 |
| 9,007,209 | B1* | 4/2015 | Ehrman | G06Q 10/08 340/540 |
| 9,020,536 | B1* | 4/2015 | Crossno | G06Q 10/0833 455/456.3 |
| 9,367,827 | B1* | 6/2016 | Lively | G06Q 10/08355 |
| 9,716,968 | B2* | 7/2017 | Mansuri | B60R 25/102 |
| 10,023,158 | B2* | 7/2018 | Coffey | B60T 1/005 |
| 10,302,478 | B1* | 5/2019 | Bennett | H04N 7/181 |
| 10,303,171 | B1* | 5/2019 | Brady | G08G 1/207 |
| 10,614,413 | B2* | 4/2020 | Curry | G06K 7/1413 |
| 2002/0017990 | A1* | 2/2002 | Okamura | G06Q 10/08 340/572.1 |
| 2003/0100305 | A1* | 5/2003 | Parisi | G08G 1/202 455/435.1 |
| 2003/0233189 | A1* | 12/2003 | Hsiao | G01C 21/26 701/521 |
| 2004/0069850 | A1* | 4/2004 | De Wilde | G06K 19/07758 235/385 |
| 2004/0246097 | A1* | 12/2004 | Queenan | G07C 9/27 340/5.61 |
| 2005/0062344 | A1* | 3/2005 | Holt | B65D 90/021 303/7 |
| 2005/0242181 | A1* | 11/2005 | Cunningham | G06Q 10/087 235/385 |
| 2006/0017551 | A1* | 1/2006 | Neher | B60R 25/04 340/426.19 |
| 2006/0091206 | A1* | 5/2006 | Olsen | G06Q 10/08 235/384 |
| 2006/0136237 | A1* | 6/2006 | Spiegel | G06Q 10/083 705/330 |
| 2006/0202817 | A1* | 9/2006 | Mackenzie | G06Q 10/08 340/539.13 |
| 2007/0069877 | A1* | 3/2007 | Fogelstrom | B60C 23/0408 340/442 |
| 2007/0216542 | A1* | 9/2007 | Brosius | G06Q 10/08 340/989 |
| 2007/0267509 | A1* | 11/2007 | Witty | G01D 9/005 236/51 |
| 2007/0282716 | A1* | 12/2007 | Branigan | G06Q 30/0601 705/28 |
| 2007/0290836 | A1* | 12/2007 | Ainsworth | G06Q 10/08 340/539.13 |
| 2008/0042817 | A1* | 2/2008 | Fogelstrom | B60C 23/0408 340/442 |
| 2008/0061924 | A1* | 3/2008 | Labowicz | G07C 9/00912 340/5.5 |
| 2008/0068170 | A1* | 3/2008 | Ehrman | G06Q 10/08 340/572.1 |
| 2008/0073422 | A1* | 3/2008 | Zhou | G06Q 10/06 235/375 |
| 2008/0111667 | A1* | 5/2008 | Mackenzie | G07C 5/008 340/431 |
| 2008/0111689 | A1* | 5/2008 | Schuler | G06Q 10/08 340/572.1 |
| 2008/0143593 | A1* | 6/2008 | Graziano | G06Q 10/08 342/357.46 |
| 2008/0179908 | A1* | 7/2008 | Haber | B60K 28/12 296/37.6 |
| 2008/0231459 | A1* | 9/2008 | Corder | G07C 5/008 340/572.7 |
| 2008/0297322 | A1* | 12/2008 | Krener | G06Q 10/087 340/10.4 |
| 2008/0303636 | A1* | 12/2008 | Chatte | G06Q 10/08 340/10.41 |
| 2009/0015400 | A1* | 1/2009 | Breed | B60C 19/00 340/539.22 |
| 2009/0026263 | A1* | 1/2009 | Schmid | G06K 19/0723 235/385 |
| 2009/0061897 | A1* | 3/2009 | Hamilton | G06Q 10/08 455/456.2 |
| 2009/0079565 | A1* | 3/2009 | Mackenzie | G08B 13/2462 340/568.1 |
| 2009/0096599 | A1* | 4/2009 | Kranz | B60C 23/045 340/459 |
| 2009/0125425 | A1* | 5/2009 | Kloostra | G06Q 10/08 705/29 |
| 2009/0160646 | A1* | 6/2009 | Mackenzie | G06Q 10/08 340/572.1 |
| 2009/0201152 | A1* | 8/2009 | Karr | G01S 5/14 340/545.6 |
| 2010/0039284 | A1* | 2/2010 | Hall | G06Q 10/087 340/8.1 |
| 2010/0179849 | A1* | 7/2010 | Muckell | G06Q 10/0631 705/7.12 |
| 2011/0050423 | A1* | 3/2011 | Cova | G06Q 10/0833 340/572.1 |
| 2011/0193710 | A1* | 8/2011 | McIlvain | B60P 3/20 340/585 |
| 2011/0254679 | A1* | 10/2011 | Todd | B60T 17/221 340/454 |
| 2011/0279253 | A1* | 11/2011 | Suda | G06Q 10/0833 340/431 |
| 2011/0315408 | A1* | 12/2011 | Kallergis | A62C 37/44 169/46 |
| 2012/0050531 | A1* | 3/2012 | Wu | G08B 13/19697 348/143 |
| 2012/0306646 | A1* | 12/2012 | Walker | G01S 19/16 340/539.16 |
| 2013/0033381 | A1* | 2/2013 | Breed | B60T 7/16 340/568.1 |
| 2013/0035901 | A1* | 2/2013 | Breed | B60C 19/00 702/188 |
| 2013/0055730 | A1* | 3/2013 | Fragnito | F25D 29/003 62/56 |

(56) References Cited

U.S. PATENT DOCUMENTS

| | | | |
|---|---|---|---|
| 2013/0065603 A1* | 3/2013 | Hovav | H04W 4/029 455/456.1 |
| 2013/0145460 A1* | 6/2013 | Dudley | B60H 1/00014 726/21 |
| 2013/0268191 A1* | 10/2013 | Telang | G08G 1/20 701/468 |
| 2013/0340444 A1* | 12/2013 | Bryant | B60H 1/00964 62/62 |
| 2013/0342343 A1* | 12/2013 | Harring | H04L 63/102 340/521 |
| 2014/0033774 A1* | 2/2014 | Ofchus | G07C 9/00571 70/264 |
| 2014/0075572 A1* | 3/2014 | Mehring | G06K 19/0717 726/28 |
| 2014/0152422 A1* | 6/2014 | Breed | G07C 9/32 340/5.52 |
| 2014/0209676 A1* | 7/2014 | Reynolds | E05F 15/40 235/385 |
| 2014/0313055 A1* | 10/2014 | Warkentin | G01N 33/02 340/870.16 |
| 2015/0022317 A1* | 1/2015 | Lange | E05B 77/48 340/5.61 |
| 2015/0339624 A1* | 11/2015 | Lozito | G06Q 10/0833 705/333 |
| 2015/0347959 A1* | 12/2015 | Skaaksrud | H04W 52/40 705/333 |
| 2016/0047646 A1* | 2/2016 | Ochsendorf | G01C 21/343 348/148 |
| 2016/0075526 A1* | 3/2016 | Avalos | B60Q 9/00 700/275 |
| 2016/0117638 A1* | 4/2016 | DiSorbo | G06Q 10/083 705/333 |
| 2016/0180274 A1* | 6/2016 | Zwakhals | G06Q 10/087 705/7.25 |
| 2016/0214551 A1* | 7/2016 | Armacost | B60D 1/36 |
| 2016/0232489 A1* | 8/2016 | Skaaksrud | H04L 67/18 |
| 2016/0239790 A1* | 8/2016 | Burch, V | G06K 7/10732 |
| 2016/0239801 A1* | 8/2016 | Burch, V | G01G 23/18 |
| 2017/0053234 A1* | 2/2017 | Lozito | G06Q 10/083 |
| 2017/0148313 A1* | 5/2017 | Zografos | G06Q 10/06312 |
| 2017/0191836 A1* | 7/2017 | Korneluk | G01C 21/20 |
| 2017/0323258 A1* | 11/2017 | Semsey | H04W 12/06 |
| 2018/0038991 A1* | 2/2018 | Chennakeshu | G01S 7/4808 |
| 2018/0041982 A1* | 2/2018 | Mulaosmanovic | H04W 8/005 |
| 2018/0061149 A1* | 3/2018 | Arena | G07C 5/008 |
| 2018/0068266 A1* | 3/2018 | Kirmani | G01G 19/005 |
| 2018/0096541 A1* | 4/2018 | O'Brien | G06K 9/00637 |
| 2018/0099712 A1* | 4/2018 | Bean | G05B 19/4185 |
| 2018/0130016 A1* | 5/2018 | Arena | G06Q 10/0832 |
| 2018/0144301 A1* | 5/2018 | Engel | G06Q 20/00 |
| 2018/0229786 A1* | 8/2018 | Weaver | H04W 84/042 |
| 2018/0249292 A1* | 8/2018 | Skaaksrud | G06Q 10/0833 |
| 2018/0253956 A1* | 9/2018 | Nygren | G08B 21/182 |
| 2018/0290621 A1* | 10/2018 | Seaman | B60R 25/33 |
| 2018/0293891 A1* | 10/2018 | Troutman | G07C 5/0825 |
| 2018/0300675 A1* | 10/2018 | Arena | H04W 4/40 |
| 2018/0341911 A1* | 11/2018 | Daoura | H04W 4/029 |
| 2018/0367872 A1* | 12/2018 | Lucrecio | G06Q 50/28 |
| 2018/0374038 A1* | 12/2018 | Fry | G01S 15/88 |
| 2019/0064806 A1* | 2/2019 | Nix | B60W 50/00 |
| 2019/0066042 A1* | 2/2019 | Conlon | H04L 63/1425 |
| 2019/0122527 A1* | 4/2019 | Qiu | G06Q 10/0832 |
| 2019/0126937 A1* | 5/2019 | Moon | G05D 1/0088 |
| 2019/0180545 A1* | 6/2019 | Tsujimura | G07F 5/26 |
| 2019/0250653 A1* | 8/2019 | Conlon | G06Q 10/0832 |
| 2019/0279494 A1* | 9/2019 | Raasch | G06Q 50/28 |
| 2019/0327692 A1* | 10/2019 | Fuleshwar Prasad | H04W 52/34 |
| 2019/0349858 A1* | 11/2019 | Jantzi | H04W 76/28 |
| 2020/0019926 A1* | 1/2020 | Ayoub | G06Q 10/0833 |
| 2020/0055553 A1* | 2/2020 | Raasch | G01S 17/08 |
| 2020/0109589 A1* | 4/2020 | Arienzo | G08B 13/2462 |
| 2020/0134410 A1* | 4/2020 | Morgan-Rottman | H04W 4/80 |

\* cited by examiner

SMART INVENTORY FOR LOGISTICS

BACKGROUND

The logistics required to manage the transportation of shipping containers and products contained therein can be quite complex. Shipping containers are typically filled with a wide variety and high volume of products. Shipping units are also typically transported in bundles, and the products contained therein can be for different recipients. Thus, in order to manage the logistics, a human is typically involved in every step of the process, including tracking the products at each stop and confirming that shipping containers have not been tampered with or products have been taken therefrom. However, such extensive human involvement is extremely cumbersome, and humans are prone to error. Moreover, often, the specifics of products (e.g., identity, storage time, location) and environmental factors of the shipping container itself cannot be assessed during shipment. These hindrances often times result in logistical errors.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for tracking one or more products via a smart transporting unit carrying the products. The smart transporting unit may be a shipping container containing the products or a transportation vehicle carrying the products. The shipping container can be a container with sufficient strength to withstand shipment, storage, and/or handling of products 106. The container can have a top, bottom, and side. For example, the container can be a dry storage container, flat rack container, open top container, tunnel container, open side storage container, or double doors container. The transporting vehicle can be a motor vehicle, a plane, or a boat. As such, the transporting vehicle can transport the products 106 without the container. The transporting unit 102 can be any type of vehicle sufficient to carry a weight and dimension of shipping containers 102 and products 106 contained therein or of products 106 themselves. For example, the transporting vehicle 102 can be a car, a truck, a bus, a van, or a plane.

As such, the transporting unit may determine—1) identify information of the shipping information, 2) a location of the transporting unit, 3) a location of the product relative to the transporting unit, 4) identity information of each of the products carried by the transporting unit, and/or 5) environmental data relating to the transportation unit. The transporting unit can then generate an encrypted message with this information and send the encrypted message to an external server. This can allow the server to identify products of transporting units and to determine and assess logistics thereof.

Figure 1:
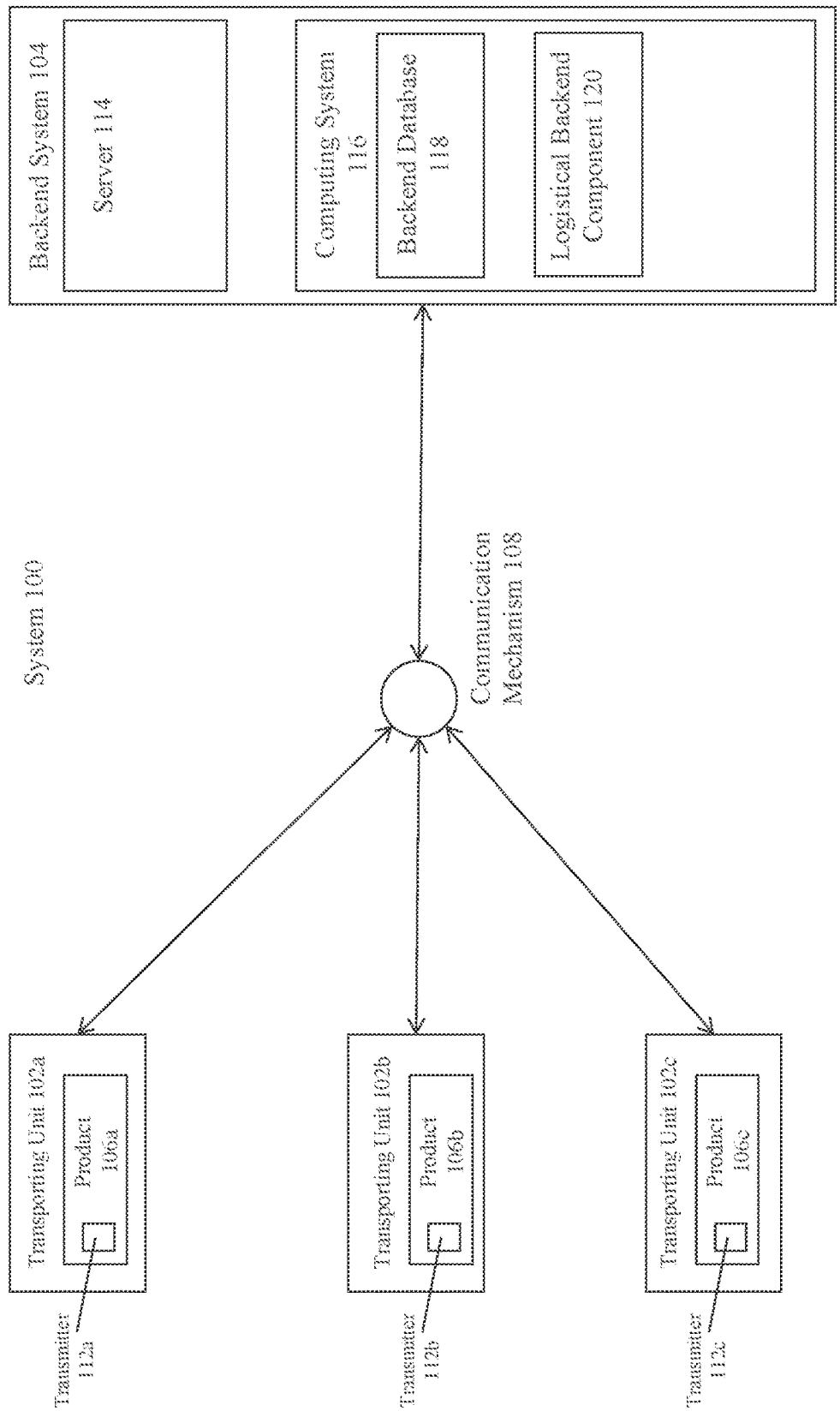
FIG. 1 illustrates a block diagram of a system comprising a smart transporting unit for tracking one or more products, according to some embodiments.

FIG. 1 illustrates a system 100 for tracking products in a smart shipping container, according to some embodiments. System 100 can include one or more transporting units 102 for transporting one or more products 105 and/or a backend system 104. The transporting unit 102 can be in communication with the backend system 104 via a communication mechanism 108. In some embodiments, each transporting unit 102 can be in communication with the backend system 104 via a communication mechanism 108 independent of a distance of the shipping container 102 from the backend system 104. The communication mechanism 108 can be, for example, a wide area network (WAN). The WAN can be a cellular network, such as GSM, CDMA, UMTS, LTE, or any other cellular connection type. In other embodiments, each transporting unit 102 can be in communication with the backend system 104 via a communication mechanism 108 dependent of a predetermined distance of the shipping container 102 and/or transportation vehicle 102 from the backend system 104. As such, communication inside of the predetermined distance can comprise a first communication mechanism, and communication outside of the predetermined distance can comprise a second communication mechanism different than the first communication mechanism. The predetermined distance can be 100 feet, 500 feet, or 1 mile, or any other distance. The first communication mechanism can be a local area network, a personal area network, system area network, or any other type of network employed by the backend system 104. The second communication mechanism can be a WAN as discussed above.

The transporting unit 102 can be of any dimension, shape, and/or form. As such, the transporting unit 102 can be made of any material suitable for its purpose (e.g., wood, metal, plastic). Moreover, the transporting unit 102 can be used to move the product 106 from a starting location to one or more destinations. The transporting unit 102 can be configured to transport a small quantity (e.g., less than 20 products) or a large quantity (e.g., up to 5,000 products) of products. In some embodiments, the transporting unit 102 can satisfy business and/or personal needs (e.g., business or personal shipping container). A shipping container satisfying a business need can be, for example, an intermodal freight container, a corrugated box, a wooden box, a bulk box, a drum, a vehicle load device, a road case, and a skip. A shipping container satisfying a person need can include, for example, a luggage, a suitcase, a backpack, and a box. For the transmitter 102 to track the product 106, the product 106 can comprise a transmitter 112 for a transceiver of the transporting unit 102 to detect, as will be discussed in more detail below. The transmitter 112 can be situated about the product 106 (e.g., in or on the product) or a package of multiple products. The transmitter 112 can be a beacon 112. The beacon can take the form of a sticker, for example. The beacon can be a radio beacon, which can transmit at a specified radio frequency. For example, the beacon can be low energy beacon, such as a Bluetooth Low Energy (BLE) beacon.

The transmitter 112 can be detectable by a transceiver of the transporting unit 102 at a predetermined distance. In some embodiments, the predetermined distance can be based on a size and/or shape of the transporting unit 102. In some embodiments, the predetermined distance can be preselected by the backend system 104. Additionally, the transmitter 112 can have a unique identifier corresponding to the product. The unique identifier can be a unique identifier in the form of a sequence of characters and/or numbers (e.g., stockkeeping unit (SKU) number). As such, the transmitter 112 can transmit the unique identifier at a specified radio frequency.

The transporting vehicle 102 can operate independent of another transporting vehicle 102. Along these lines, the transport vehicles 102 carrying the shipping containers 102 and/or products 106 can operate independent of each other. For instance, the transporting vehicle 102 may not be in communication with another transporting vehicle 102, and the shipping containers 102 may not be communication with another shipping container 102. Rather, the transporting vehicles 102 and/or shipping containers 102 may only communicate with the backend system 104. Moreover, the transporting vehicle 102 can comprise a unique identifier. The unique identifier can be different or the same as that of the shipping container 102.

The backend system 104 can comprise a server 114 and a central computing system 116 in communication with the server 114. The server 114 can be a physical device or cloud-based. Along these lines, the server 114 can be stationed away from the transporting unit 102.

The server 114 can control and/or manage communication with the transporting units 102 for the backend system 104. As such, the server 114 can receive information relating to the transporting units 102 and/or the products 106 carried by the transporting unit 102. In some embodiments, the server 114 can receive information from a plurality of transporting units 102 containing products 106, and possibly, carried by different transporting vehicles 102.

The central computing system 116 can comprise a backend database 118 and/or a logistic backend component 120, each of which can be in communication with the server 114 and each other. The backend database 118 can store information relating to the products 106 and transporting units 102 transporting unit. Information for product 106 can include one or more of a unique identifier, a stockkeeping unit (SKU) number, a shipping reference number, and a condition of what the products 106 should be maintained during shipment. Information for a transporting unit 102 can include one or more of a starting location of the transporting unit 102, products 106 carried by the transporting unit, a destination of the transporting unit 102 and/or products contained therein 106, and an expected arrival date/time of the transporting unit 102 and/or products contained therein 106 from a recipient. Similarly, information for a transporting vehicle 102 can include one or more of a starting location of the transporting unit 102 and/or products 106 being transported thereby (e.g., with or without the shipping container 102), a destination of the transporting unit 102 and/or products 106 being transported thereby, and an expected arrival date/time of the transportation vehicle 102 and/or products 106 contained therein from a recipient. Moreover, information for a transporting unit 102 can also include a unique identifier, a type of transporting vehicle, a maximum size capacity for carrying shipping containers, and a maximum weight capacity for carrying shipping containers. In some embodiments, the backend database 118 can store information relating to a plurality of products 106 transported in a plurality of shipping containers 106 and/or by transport vehicles 102.

The logistic backend component 120 can control the planning, executing, and/or control shipping of a product 106 and/or a transporting unit 102. To do so, the logistic backend component 120 can be in communication with a starting location and/or destination for the and/or transporting unit 102. The logistic backend component 120 can receive information of the transporting unit 102 product 106, and/or the transporting unit 102. Thereafter, the logistic backend component 120 can determine plan, execute, and/or control shipping of the product 106 and/or transporting unit 102. This can be done based on one or more predefined business rules.

Based on information of the backend database 118 and logistic backend component 120, the central computing system 116 can present information relating to a user viewing a status of a shipment of products 106 by the transporting units 102. For example, the user can view one or more of an estimated time of arrival of the transporting unit 102, a progress of delivery by the transporting unit 102 (e.g., a location, a percentage of trip completed, etc.), a maximum acceleration applied to transporting unit 122, a maximum acceleration applied to a product 106 carried by the transporting unit 102, a tampering of the transporting unit 102, and a removal of the product 106 from the transporting unit 102, to name just some examples. This can allow a user to modify a current delivery or plan for future shipments. This can also allow a user to determine if a particular shipping container 102 is suitable for particular products 106, and if particular products 106 were transported outside of certain environmental conditions.

Figure 2:
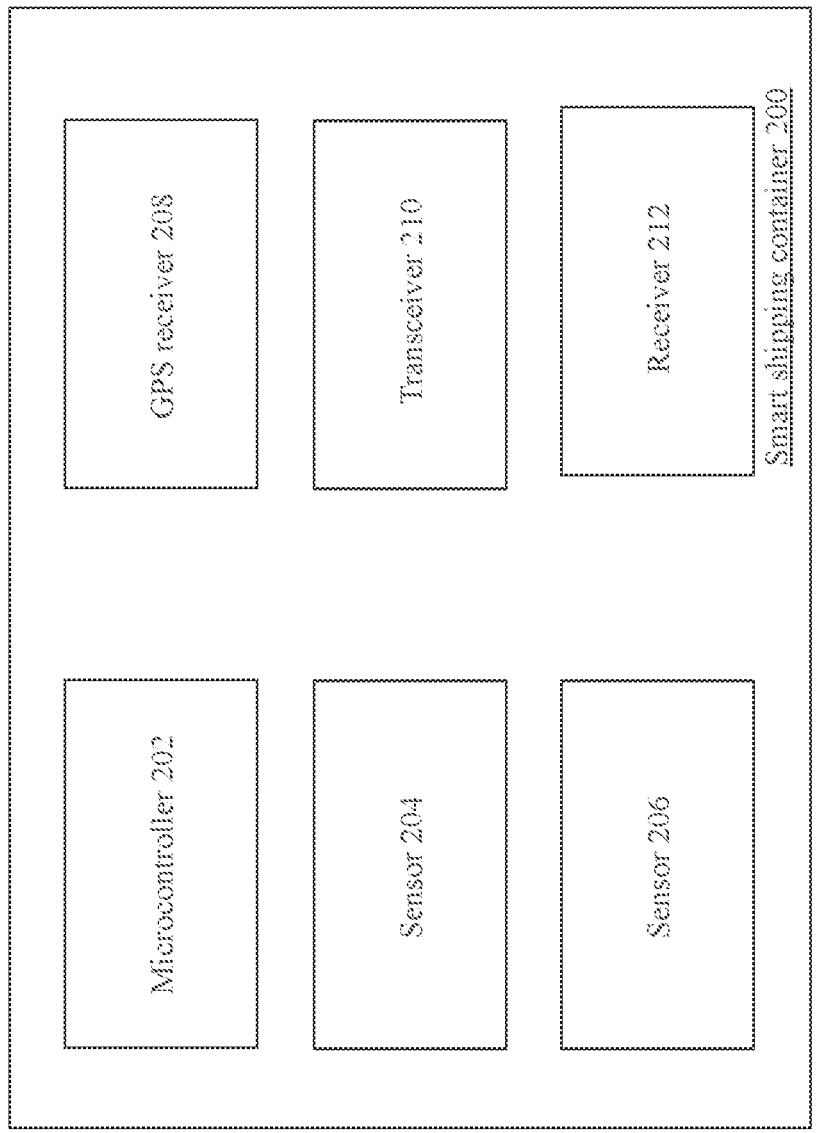
FIG. 2 illustrates a block diagram of the transporting unit of FIG. 1, according to some embodiments.

FIG. 2 illustrates an exemplary block diagram of a transporting unit 200 that can be utilized in the system 100 of FIG. 1. The transporting unit 200 can include a microcontroller 202, one or more sensors 204, 206, a global positioning system (GPS) receiver 208, a transceiver 210, and a receiver 212. One or more of these components can be integrated into the transporting unit 200, or can be attached to a portion of the transporting unit 200 itself.

Alternatively, although not illustrated, the transporting unit 200 can comprise an onboard unit for carrying one or more of the above-mentioned components. The onboard unit can enclose the components and protect them from external elements, such as incidental damage, tampering, and weather. The onboard unit can be affixed to an interior portion of the transporting unit 200.

The microcontroller 202 and/or receiver 212 can be in communication with the sensors 204, 206, the GPS receiver 208, and/or the transceiver 210. The microcontroller 202 and/or receiver 212 can receive information of the transporting unit 200 and/or products contained therein, as will be described in more detail below. In some embodiments, the microcontroller 202 can receive information directly from the sensors 204, 206, the GPS receiver 208, and/or the transceiver 210. Alternatively, the receiver 212 can receive the information directly from the sensors 204, 206, the GPS receiver 208, and/or the transceiver 210. The receiver 212 can store the information for a period of time. The microcontroller 202 can then receive the information from the receiver 212.

Upon receiving the information of the transporting unit 200 and/or products being transported thereby, the microcontroller 204 can thereafter bundle the information together in a single message. For example, the message can comprise a location of a shipping container and/or products contained thereon, environmental data inside of the shipping container itself, an identification of the product (e.g., a unique identifier assigned to a transmitter, as described above), a unique identifier of the shipping container, and/or a location of the shipping container. The unique identifier of the transporting unit 200 can be preloaded onto the microcontroller 204, and can be assigned by a backend system 104 (illustrated in FIG. 1).

Along these lines, in some embodiments and for security purposes, the message may not comprise information indicative of the shipping container 200 itself or any products contained therein. For instance, the message may not provide a location of the transporting unit 200 and an identity of any products contained therein. The message can be encrypted and transmitted via a communication mechanism 108 to the backend system (depicted in FIG. 1). In some embodiments, the message can be encrypted only when transmitted via a certain communication mechanism 108. For example, the message can be encrypted only when transmitted on a WAN or any other type of public network.

The sensor 204 can be an environmental sensor for determining environmental data relating to the transporting unit 200 itself. For example, where the transporting unit 200 is a shipping container, the sensor 204 can determine environment inside of the shipping container. Moreover, the environmental data can relate to one or more environmental conditions relating to the transporting unit 200 itself. Environmental conditions of the shipping container include, for example, temperature, humidity, mechanical shock(s), external light, barometric pressure, sound, altitude, acceleration, carbon dioxide, etc.

Moreover, where the transporting unit 200 is a shipping container, there may be an additional sensor 206. The sensor 206 can determine if the shipping container is securely closed at specified times. To do so, the sensor 206 can be placed near an opening of the shipping container where products are inserted into. For example, the sensor 206 can be placed on or near a lid of the shipping container 200. Moreover, in some embodiments, the sensor 206 can constantly check the closure of the shipping container. For example, the sensor can constantly check the closure of the shipping container from departure to arrival. In some embodiments, the sensor 206 can check closure of the shipping container only prior to departure and upon arrival. In some embodiments, the sensor 206 can periodically check the closure of the shipping container at specified intervals of time (e.g., every 30 minutes, 1 hour, or morning at 9:00 AM). As such, when the sensor 206 constantly checks for closure of the shipping container or does so at specified intervals of time, the backend system 104 can confirm a proper inventory of the shipping container 102 via the transceiver 210, as will be discussed in more detail below.

In the above embodiments, where the sensor 206 has not been triggered (e.g., the shipping container has remained closed) or has not detected an opening of the shipping container, the microcontroller 202 can assume the same inventory of products as previously determined by the transceiver 208. As such, the microcontroller 202 may not transmit inventory and/or sensor information, and the backend system 104 (shown in FIG. 1) can assume that there has been no change in inventory. This can reduce the size of the message that the microcontroller 202 has to transmit to the backend system 104. Alternatively, where the sensor 206 has not been triggered (e.g., the shipping container has remained closed) or has not detected an opening of the shipping container, the microcontroller 202 may not transmit message to the backend system until such a time that the sensor 206 detects that the shipping container is no longer closed. This can reduce the amount of messages being sent by the microcontroller 202 to the backend system.

The GPS receiver 208 can capture GPS location from one or more satellites and acquire longitude and latitude location of the shipping container 208. The GPS receiver 208 can also acquire a time stamp each retrieval of longitude and latitude location. This can assist the backend system 104 (shown in FIG. 1) in determining a distance traveled of the transporting unit 200, a velocity at which the shipping container is traveling, an estimated time of arrival of the transporting unit 200, etc. The GPS receiver 208 can capture location information of the transporting unit 200 at predefined intervals. For example, the GPS receiver 208 can capture location information at specified intervals of time. Alternatively, the GPS receiver 208 can acquire location information of the transporting unit 200 per request of the backend system 104 (depicted in FIG. 1).

The transceiver 210 can detect a transmitter 112 (illustrated in FIG. 1) situated about a product, as discussed above. To do so, in some embodiments, the transceiver 210 can be situated at or near a location of the transporting unit 200 that products are placed therein/thereon. This can ensure that products/placed in/on the transporting unit 200 are detected. In some embodiments, the transceiver 210 can be located at a center of the transporting unit 200. This can ensure that all products placed in/on the transporting unit 200 are detected.

Moreover, the transceiver 210 can determine a location of a product 106 relative to the transporting unit 200 based on information received from a transmitter 112 of the product 106 (illustrated in FIG. 1). For example, where the transportation unit is a shipping container, the transceiver 210 can determine if the transmitter of the product is located inside or outside of the shipping container. The transceiver 210 can also determine a precise location of the transmitter of the product relative to the transporting unit 200 (e.g., inside of the shipping container). To do so, the location of the transmitter of the product can be a geographical location with respect to a reference point of the shipping container (e.g., a bottom center, a market point), and/or can be a location relative to transmitters of other products.

Figure 3:
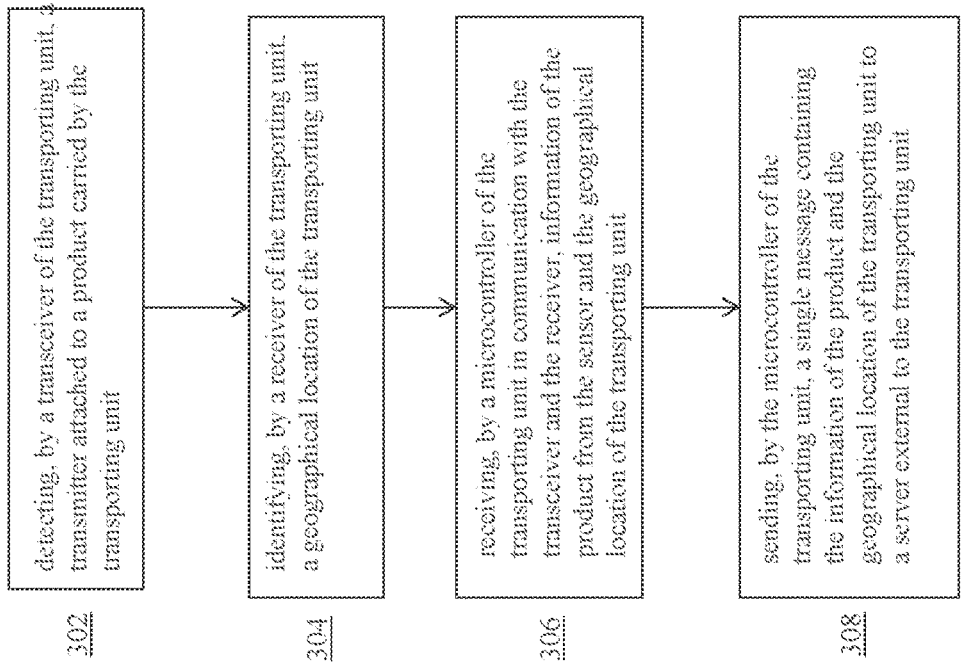
FIG. 3 illustrates a flowchart of a process for tracking one or more products using a transporting unit, according to some embodiments.

Furthermore, the transceiver 210 can determine a location and/or presence of a product relative to the transporting unit 200. For example, where the transporting unit 200 is a shipping container, the transceiver 210 can determine a location and/or presence of a product in the shipping container. This can ensure that sensitive products have not moved too much. Additionally, the transceiver can determine the location/presence of the product at one or more intervals. The intervals can be the same or different as those of sensor 206 discussed above. The interval can be before or after delivery. Alternatively, the interval can be a specific time (e.g., 30 seconds, 1 hour, 24 hours). This can ensure that sensitive products have not moved too much. Moreover, the transceiver 210 can determine the location/presence of the product based on detection of tampering or change in a state of the transporting unit 200. For example, where the transporting unit 200 is a storage container, the transceiver can determine the location/presence of the product upon detection of a tampering or change in state of the storage unit (e.g., opening of the shipping container). By checking for the presence of the products, this can ensure that they have not been taken from the shipping container 200. FIG. 3 is a flowchart for a method 300 for tracking products using a smart transporting unit, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 2. However, method 300 is not limited to that example embodiment. In 302, a transceiver of the transporting unit may detect a transmitter attached to a product carried by the transporting unit. For example, the transceiver 210 of the transporting unit 200 may detect a plurality of transmitters, each of which are attached to a different product. The transmitter may be a low energy beacon.

In 304, a receiver of the transporting unit may receive identifying information and a geographical location pertaining to the product. For example, the receiver 210 of the transporting unit 200 may receive a unique identifier or any other data pertaining to the identity of the product. The geographical location of the product can be in relation to the transporting unit 200 (e.g., inside or outside of the smart shipping container).

In 306, the microcontroller of the transporting unit may receive the identifying information and the geographical location of the product from the sensor. For example, the microcontroller 202 of the transporting unit 200 can receive the unique identifier and a longitude and latitude coordinate of the product from the sensor.

In 308, the microcontroller of the transporting unit may send the information pertaining the product and the geographical location of the transporting unit to a server. For example, the microcontroller 202 of the transporting unit 200 may send an encrypted message containing information pertaining to the product. The message can be transmitted over a cellular connection.

Each of the aforementioned steps can be performed with the embodiments described above (e.g., with respect to FIGS. 1 and 2, for example).

Figure 4:
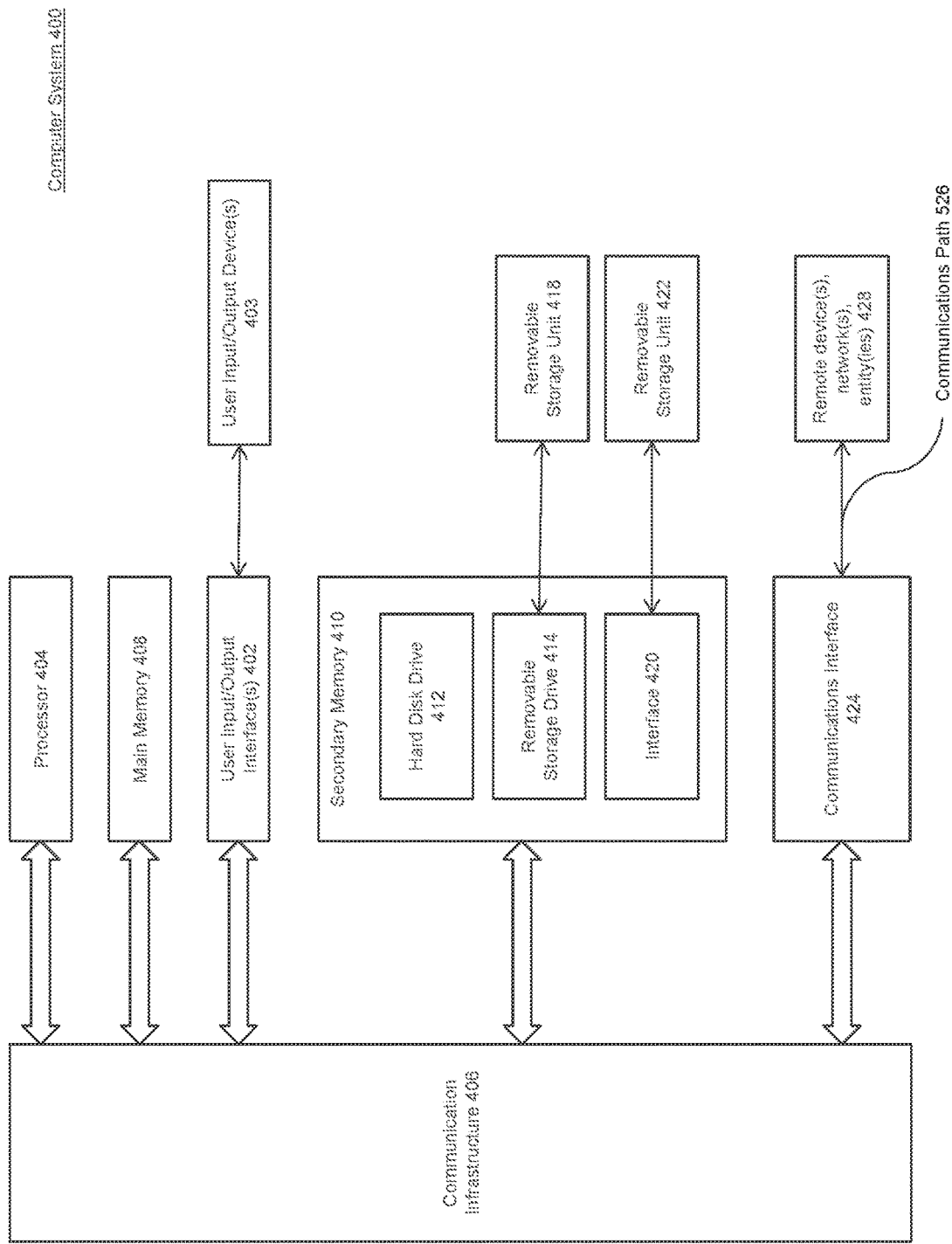
FIG. 4 illustrates an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

We claim:

1. A transporting unit, comprising:
 a first sensor configured to detect whether the transporting unit is open or closed;
 a transceiver configured to detect, from a transmitter attached to a product carried by the transporting unit, identifying information for the product;
 a GPS receiver configured to receive a geographical location pertaining to the transporting unit; and
 a microcontroller in communication with the first sensor, the transceiver, and the GPS receiver, the microcontroller configured to:
  send a first message comprising the identifying information and the geographical location pertaining to the transporting unit to a server external to the transporting unit;
  determine, based on the first sensor, that the transporting unit has remained closed since sending the first message; and
  send, after determining that the transporting unit has remained closed, a second message shorter than the first message to the server, the second message omitting the identifying information.

2. The transporting unit of claim 1, further comprising:
 a second sensor in communication with the microcontroller and configured to detect environmental data pertaining to the transporting unit,
 wherein the second message comprises the environmental data pertaining to the transporting unit.

3. The transporting unit of claim 2, wherein the environmental data comprises at least one of mechanical shock, temperature, humidity, air pressure, and air flow pertaining to the transporting unit.

4. The transporting unit of claim 1, wherein the transceiver is configured to detect the transmitter at specified time intervals.

5. The transporting unit of claim 1, wherein the transmitter is associated with a unique identification number of the product, and wherein the first message further comprises the unique identification number of the product.

6. The transporting unit of claim 1, wherein the transmitter is a low energy beacon.

7. The transporting unit of claim 1, wherein the microcontroller is in communication with the server over a cellular network.

8. The transporting unit of claim 1, wherein the first message is encrypted.

9. The transporting unit of claim 1, wherein the transceiver is configured to detect the transmitter attached to each of a plurality of products, and wherein the first message comprises information pertaining to each product and the geographical location of the transporting unit.

10. The transporting unit of claim 1, wherein the transporting unit comprises a unique identification number, and wherein the first message further comprises the unique identification number of the transporting unit.

11. The transporting unit of claim 1, wherein the transporting unit is a shipping container.

12. The transporting unit of claim 1, wherein the transporting unit is a transportation vehicle.

13. The transporting unit of claim 1, wherein the transceiver is further configured to determine a location of the product within the transporting unit, and wherein the first message further comprises the location of the product within the transporting unit.

14. A method of operating a transporting unit, comprising:
detecting, by a transceiver of the transporting unit, identifying information for a product carried by the transporting unit from a transmitter attached to the product;
receiving, by a GPS receiver of the transporting unit, a geographical location pertaining to the transporting unit;
receiving, by a microcontroller of the transporting unit in communication with the transceiver and the GPS receiver, the identifying information and the geographical location pertaining to the transporting unit;
sending, by the microcontroller of the transporting unit, a first message comprising the identifying information and the geographical location to a server external to the transporting unit;
determining, by the microcontroller and based on a first sensor configured to detect whether the transporting unit is open or closed, that the transporting unit has remained closed since sending the first message; and
sending, by the microcontroller after determining that the transporting unit has remained closed, a second message shorter than the first message to the server, the second message omitting the identifying information.

15. The method of claim 14, further comprising:
detecting, by a second sensor in communication with the microcontroller, environmental data pertaining to the transporting unit,
wherein the second message comprises the environmental data pertaining to the transporting unit.

16. The method of claim 14, further comprising:
determining, by the transceiver, a location of the product within the transporting unit, wherein the first message further comprises the location of the product within the transporting unit.

17. The method of claim 14, further comprising:
detecting, by the transceiver, the transmitter attached to each of a plurality of products, wherein the first message further comprises information pertaining to each product and the geographical location of the transporting unit.

18. The method of claim 14, wherein the transporting unit is a shipping container.

19. The method of claim 14, wherein the transporting unit is a transportation vehicle.

20. A non-transitory computer-readable device having instructions stored thereon that, when executed by at least one computing device, cause the at least one computing device to perform operations comprising:
detecting, using a transceiver, identifying information for a product carried by a transporting unit from a transmitter attached to the product;
receiving, using a GPS receiver, a geographical location pertaining to the transporting unit; and
sending, using a microprocessor, a first message comprising the identifying information and the geographical location to a server external to the transporting unit;
determining, based on a sensor configured to detect whether the transporting unit is open or closed, that the transporting unit has remained closed since sending the first message; and
sending, after determining that the transporting unit has remained closed, a second message shorter than the first message to the server, the second message omitting the identifying information.

* * * * *